Feb. 11, 1941. C. J. CARLOTTI ET AL 2,231,660
ELECTRICAL CIRCUIT EXPLORING TESTER
Filed Nov. 15, 1938
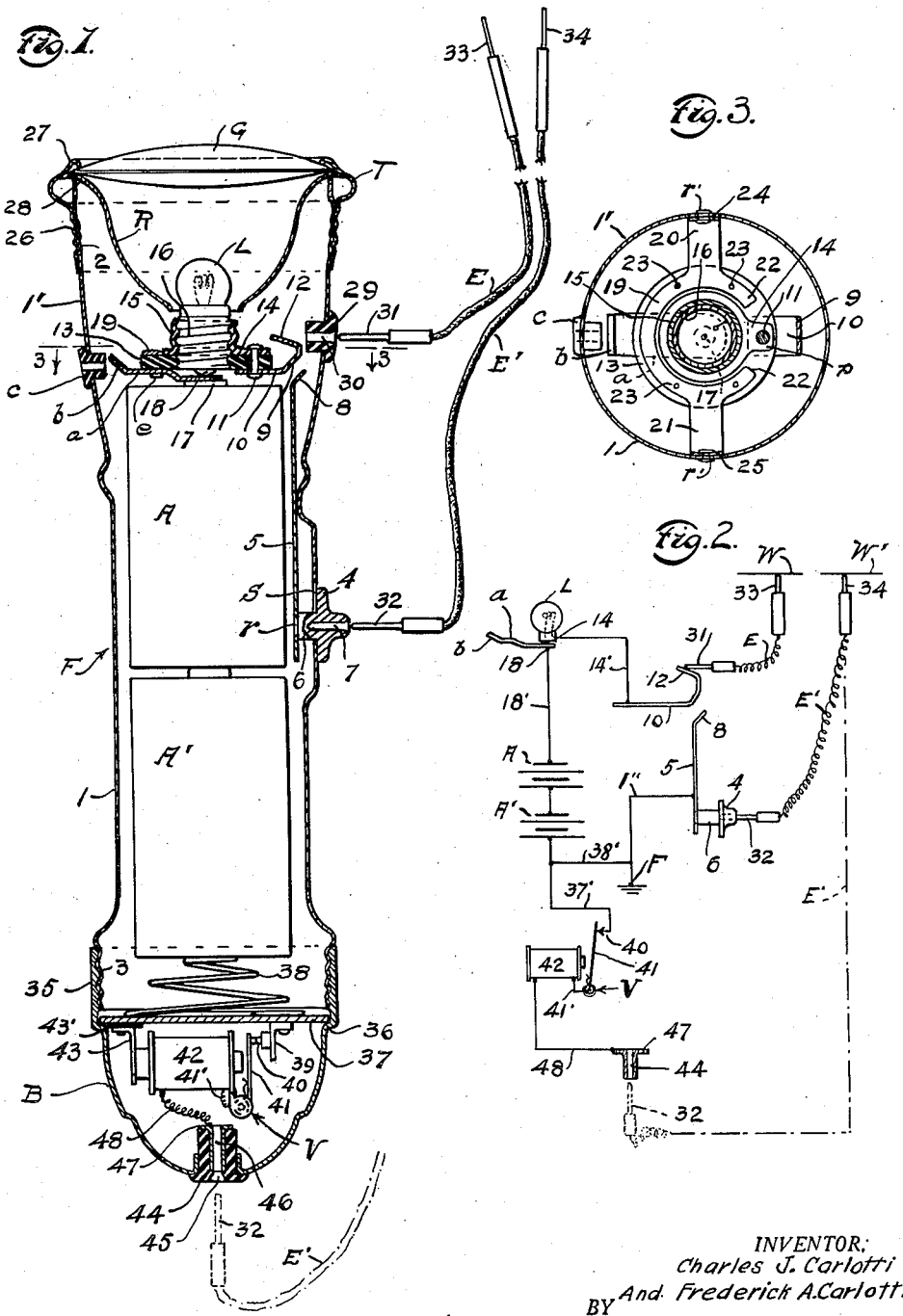
INVENTOR:
Charles J. Carlotti
And Frederick A. Carlotti
BY Harold D. Penney ATTORNEYS.

Patented Feb. 11, 1941

2,231,660

UNITED STATES PATENT OFFICE 2,231,660

ELECTRICAL CIRCUIT EXPLORING TESTER

Charles J. Carlotti and Frederick A. Carlotti, New York, N. Y.

Application November 15, 1938, Serial No. 240,483

15 Claims. (Cl. 175—183)

The present invention relates to an improvement in electrical testing devices, and has for its principal object the provision of means whereby to explore electrical circuits which have become defective through breakage of the conductors, or other faults.

One of the principal features of advantage lies in the provision, in a testing device of this nature, of signalling means, whereby both visual and audible signals may be simultaneously, or separately given, during exploratory testing operations.

The present device is particularly useful in testing for broken wiring in low voltage systems, especially in automobile electric circuits where one side of the electrical system is usually grounded on the chassis of the vehicle.

In testing such defective wiring where it is exposed in open daylight and may easily be followed, only the audible signal may be used, but when testing in remote, dark locations both the audible and visual signals may be used, thereby to receive an unmistakable testing signal, or the visual signal may be used, only.

When not in exploratory testing use for shorts or grounds, the device may further be used as an electric hand torch in the usual manner.

The foregoing, and other features of advantage will be noted as the herein description proceeds, and it will be obvious that modifications may be made in the structure herein disclosed, without departing from the spirit hereof or the scope of the appended claims.

In the drawing,

Fig. 1 is a longitudinal sectional view of the device, in elevation;

Fig. 2 is a diagrammatic view of the wiring circuit of the present device; and

Fig. 3 is a transverse sectional view taken on the line 3—3, Fig. 1, looking in the direction of the arrows.

In Figs. 1 and 3, like numerals or indices are used for like parts of the circuit forming elements and a description of one of these views includes a description for both figures.

In Fig. 1 the complete construction, generally denoted by F, comprises an outer metallic casing I, preferably cylindrical in cross section, which acts as a common ground for the various circuits. The upper end of the casing, as viewed in Fig. 1 is provided with an open ended lens holding ferrule, generally denoted by T, the upper edge of which is provided with an inturned flange 27, which engages with the perimeter of a lens G. The lower end of ferrule T is provided with a threaded section 26, which engages with the threaded portion 2, of the casing I.

The upper end of the casing I, beyond the threaded section 2, supports the flared end 28 of a parabolic reflector R, the lower end of which surrounds but does not contact with an incandescent bulb L. The upper edge of the reflector serves as a support at the underface edge of the lens G, and thus the lens is clamped between the lower edge of ferrule flange 27 and the upper flanged edge of the reflector 28.

The incandescent bulb L, of the usual miniature type has its metallic, threaded end 16 mounted in a flanged, metallic threaded socket 15, the flange 14 of which is fixedly mounted upon a dielectric supporting disc 13 by a conductor rivet 11, Figs. 1 and 3.

The disc 13 is mounted in operative bulb supporting position by a, preferably, metallic gapped support ring 19, which has two oppositely extending support arms 20—21, the ends 24—25 of which are upturned and oppositely riveted by rivets or eyelets r' and r' to the side wall of the casing I. The gapped ring 19 is riveted to the dielectric disc 13, by a plurality of rivets 23. The pronged portion p of the socket flange 14 extends between the ends 22 of the gapped portion of ring 14, and is not in electric connection therewith.

On the underside of the dielectric disc 13 is fixedly mounted, by the conductive rivet 11, a resilient contact switch tongue 10, which has its outer end bent upwardly and over to form a spring plug contact 9—12, Fig. 1. This contact, through rivet 11, is in electrical contact with the bulb socket 15.

A dielectric plug 29, having a pin plug bore 30, is located in the casing I, in operative relation with the contact end 12 of switch 10, so that when the end of metallic plug 31 is inserted therein the said end 31 makes electrical contact with said switch end 12. The pin end 31 is removably held in its contact position by the resilient deformation of the spring contact end 12.

On the under face of the disc 13, and at the opposite side to spring contact tongue 10, is located a second spring contact a which is firmly attached in operative position to said disc 13, by means of a dielectric rivet e. The end of the contact is upturned slightly to form a spring contact terminal b. A bored dielectric bushing c is located in the wall of the casing I adjacent to the terminal end b, so that a pin prong end 31 may be inserted therein to form a conductive contact with terminal b. This connection, as will be later explained, in detail provides a circuit connection which causes the audible alarm only, to operate, during exploration for faults.

In the customary manner, the casing interiorly supports two replaceable dry cells A and A', which are in conductive contact with each other in the usual manner of hand torch construction. When in the position described, the conductive tit 18 of the bulb L is in electrical contact with the positive terminal 17 of the cell A, through the interposed end of switch a. The cells A and A', are replaceable through the bottom of casing 1, by unscrewing of the bottom cap B, which is threadedly engaged by its ferrule 35 to the lower threaded end 3 of the casing 1. The cap B, by its shoulder 36, conductively supports a conductive metallic disc 37, upon the upper face of which is mounted a metallic, cell supporting spring 38, the said spring being in conductive contact with the negative end of cell A' and said disc 37, the said disc being in electrical contact with shoulder 36.

On the underside of said disc 37, and within the interior of the cap B, is mounted an audible signal means in the form of a buzzer of known construction, and it comprises an L-shaped terminal support 43, which is affixed to dielectric insulator 43', this in turn being affixed to disc 37, so that this end of the wound magnet 42 is not in conductive contact with said disc 37.

The terminal support 43 is connected to the magnetic core of the coil 42 and thereby supports the entire buzzer in operative position. The buzzer, in its construction, further includes a conductive, L-shaped terminal 39 which is fixedly mounted in conductive relation on the disc 37, and mounts the usual contact tip 4, and against this tip rests a tipped spring buzzer contact 41, the opposite end V of which is fixedly supported on one end of the coil by the usual dielectric end collar. The fixed end of the vibratable buzzer spring 41 is connected to the winding of the coil magnet 42 by a connector 41'. The opposite end of the coil magnet is connected to the flange 47 of a metallic pin plug bushing 46, by a connector 48. The conductive bushing 46 is firmly mounted in the bore 45 of a dielectric bushing 44, which itself is operatively mounted in the bottom end of cap B.

The casing 1 is provided with an intermediate slot S, Fig. 1 in which is mounted the usual slidable switch button 4, to which is attached the conductive strip 5, at r, the upper end of said strip 5 being bent to form a switch end 8, which, when the button 4 is slid upwardly, contacts with portion 9 of switch 10, and closes the bulb circuit, when used as a flash light or hand torch. When so used, the torch is without extraneous connections.

The metallic button 4 is provided with a pin plug bore 7, into which, when the device is used as an exploratory tester, is entered a metallic pin plug 32, Fig. 1, to connect, in part, a portion of an exploratory circuit, as will now be described.

When it is desired to explore a troubled circuit, and obtain a visual signal only, i. e., to light the bulb only, bared plug pin 31 of a testing conductor wire E is entered into bushing 29 to contact with the switch end 12, and the bared plug pin end 32 of a testing conductor wire E' is entered in the bore 7 of button 4, and this forms the lighting circuit, which when the bared testing prongs 33—34 on the opposite end of the conductive, covered testing wires E and E' find a fault in a troubled circuit, the light L either by going out, or by lighting, depending on a negative or positive test, will indicate the source of trouble.

In some tests, the bulb L, will be lighted continuously and go out on detection of a fault, and under other conditions of exploration the bulb will light upon detection of a fault.

The circuit formed by the foregoing arrangement is as follows; upon plugging in pins 31 and 32 as described, and the bridging of a break represented by the wires W and W', Fig. 2, the active circuit thus formed comprises the tester 34 on wire W', thence through conductor wire E' to button 4, thence through the grounded casing F, Fig. 1, or connections 1'', Fig. 2, from switch blade 5, thence through spring 38, or 38', thence through the batteries A'—A, thence through the bulb contact 18 or 18', and finally through switch 12 to plug pin 31, and from thence through conductor E to wire W.

When it is desired to explore a troubled circuit and receive a dual visible and audible signal the pin plug 32 on exploring conductor E' is entered into the lower plug socket 46, leaving pin plug 31 in contact with switch 12, and this closes the buzzer and bulb circuits and causes both circuits to render the buzzer and bulb operative.

In the above dual signal circuit, with the plug pins mounted as immediately above described, the following circuit is established; from wire W' through conductor E' to the bushing contact 45, through coil 42 and the vibrating switch means to disc 37, through the batteries A'—A, through the bulb L, through switch 12 to the conductor wire E to exploring pin 33 to W. Thus the buzzer and bulb L are caused to give dual alarm.

When it is desired to explore with an audible signal only, the pin plug 32 on exploring conductor E' is inserted into the plug bushing 46 and the pin plug 31 on conductor E is inserted in the bore of insulated bushing C until the pin plug 31 contacts with the end b of spring contact a, Fig. 1.

The circuit established in this latter use is as follows; with the plug pin 34 on wire W', the circuit is closed through conductor wire E' to plug 31 through switch a, through the batteries A and A', through spring 38, through the buzzer 42 and its connections 41—40—39 and 48, through plug bushing 46, and through pin plug 32, through conductor E to wire W. Thus the bulb and ground F are cut out and only the buzzer is in circuit.

When the exploring conductors E and E' are not used, the button switch 4 may be used to operate the bulb as a hand torch or flash light, in the well known manner.

Having thus described the invention what is claimed is:

1. In combination, a portable metallic casing having a dielectric member mounted therein; an electric lamp mounted on the member to hold the lamp thimble with its conductive tit rearwardly exposed; a contact tongue mounted on the member and engaging said tit, and having contact portion; a switch tongue electrically connected to said lamp thimble; means adapted to hold a metallic plug pin of a flexible testing cable engaged with said contact portion; a switch member adapted to receive a cable plug pin and engaged with the casing wall and the other being engageable with said switch tongue; and a source of current having one terminal connected with said contact tongue and the other with said casing.

2. In combination, a portable metallic casing having a dielectric member mounted therein; an electric lamp mounted on the member to hold the lamp thimble with its conductive tit projected; a contact tongue mounted on the member and engaging said tit, and having contact portion; a switch tongue electrically connected to said lamp thimble; means adapted to hold a metallic plug pin of flexible testing cable engaged with said contact-portion; a switch having one member engaged with the casing wall and the other being engageable with said switch tongue; a source of current having one terminal connected with said contact tongue and the other with said casing; a buzzer mounted in casing having one terminal connected to the casing; and a conductive means adapted to receive a testing cable pin and insulated from and carried by the casing and electrically connected to the other terminal of the buzzer.

3. A tester comprising a portable metallic casing having a dielectric member mounted therein; an electric lamp mounted on the member; a contact tongue mounted on the member and engaging one terminal of the lamp and having contact portion; a switch tongue electrically connected to said other terminal of the lamp and having contact portions; means adapted to hold metallic plug pins of flexible testing cables engaged with said contact portions respectively; a movable switch member adapted to receive one of said pins and engaged with the casing wall and engageable with said second named contact portion; and a source of current having one terminal connected with said contact tongue and the other with said casing.

4. A tester as in claim 3 comprising a buzzer mounted in casing having one terminal connected to the casing; and a conductive means adapted to receive one of said pins and insulated from and carried by the casing and electrically connected to the other terminal of the buzzer.

5. In combination, an elongated metallic casing having a dielectric member mounted in its forward end; a conductive lamp socket mounted on the member to hold an electric lamp thimble with its conductive tit disposed rearwardly; a contact tongue mounted on the member with its inner end engaging said tit, its outer end forming an inclined contact portion; a switch tongue electrically connected to said socket and having its outer end bent to form a contact face and an inclined contact portion; dielectric bushings passing through said casing and adapted to guide metallic plug pins to engage said contact portions respectively; a bored exterior metallic button having a part longitudinally slidable in the casing wall in electric contact therewith and having a contact engageable with said face; and a source of current in said casing, having one terminal engaged with said spring contact tongue and the other end electrically connected to said casing.

6. In a combination as in claim 5, a metallic disk mounted across the rear of the casing in electric contact therewith; a dome-shaped cap covering the disk; a buzzer mounted in the cap on the disk and having one terminal connected to the disk; and a conductive bushing insulated from and passing through said cap and electrically connected to the other terminal of the buzzer.

7. In combination, a cylindrical metallic casing having a lens at the forward end; a dielectric disk mounted across the interior of the forward end and having a central opening; a lamp socket mounted on the forward face of the disk coaxial with said opening and adapted to receive an electric lamp thimble with its conductive tit projecting rearwardly of the disk; a spring contact tongue mounted on the rear face of the disk and having its inner end lying flat against said tit, the outer end being turned at an angle to the plane of the disk to form an inclined contact portion; a switch tongue electrically connected to said socket and secured to said rear face on the side opposite to said contact tongue and having its outer end bent outwardly and forwardly to form an inner contact face, and then inwardly forwardly to form an inclined contact portion; dielectric bushings axially passing through said casing and adapted to receive metallic plug pins in position to engage said contact portions respectively; said casing having an intermediate longitudinal slot therein; a bored metallic button having a part slidable in said slot and provided with a spring contact engageable with said contact face; and a source of current in said casing having one terminal connected to the casing and the other engaged with said contact tongue at said tit.

8. In combination, an elongated cylindrical metallic casing having an exteriorly threaded rear end and a dielectric member mounted in its forward end; a conductive lamp socket mounted on the member to hold an electric lamp thimble with its conductive tit disposed rearwardly; a spring contact tongue mounted on the member with its inner end engaging said tit, its outer end forming an inclined contact portion; a switch tongue electrically connected to said socket and having its outer end bent to form a contact face and an inclined contact portion; dielectric bushings passing through said casing and adapted to guide metallic plug pins to engage said contact portions respectively; a bored exterior metallic button having a part longitudinally slidable in the casing wall and having a contact engageable with said face; a metallic disk received across the rear end edge of the casing; a dome-shaped cap having threads engaged on said threaded end and an inner annular shoulder engaged on the rear face of the metallic disk; a buzzer mounted in the cap on the rear face of the metallic disk and having one terminal electrically connected to the disk; a conductive bushing insulated from and passing through said cap and electrically connected to the other terminal of the buzzer; a pair of end-to-end dry cells disposed in said casing, one having an axial terminal in contact with said spring contact tongue at said tit; and a spring compressed between said metallic disk and the rear end of the other cell.

9. In combination, a portable metallic casing having a dielectric member mounted therein; an electric lamp mounted on the member to hold the lamp thimble with its conductive tit rearwardly; a contact tongue mounted on the member and engaging said tit, and having a contact portion; a switch tongue electrically connected to the lamp thimble; means adapted to hold a metallic plug pin of a flexible testing cable engaged with said contact portion; a switch member adapted to receive a cable plug pin and engaged with the casing wall and the member being engageable with said switch tongue; a source of current having one terminal connected with said contact tongue and the other with said casing; a buzzer mounted in the casing having one terminal connected to the casing; and a conductive means adapted to receive a testing cable pin and insulated from, and carried by, the casing ing and electrically connected to the other terminal of the buzzer.

10. In combination, a portable metallic casing; an electric lamp mounted in the casing and insulated therefrom; an insulated metallic strip electrically connected to one terminal of the lamp; insulated means adapted to hold a metallic plug pin of a flexible testing cable engaged with said member; a switch having one member engaged with the casing wall and the other engageable with said strip, a source of current having one terminal electrically connected with the other terminal of the lamp; an audible means mounted in the casing; a conductive means adapted to receive a testing cable pin and insulated from, and carried by the casing, and electrically connected to the one terminal of the audible device; and means for electrically connecting the other terminal of said source with the other terminal of the audible device.

11. In combination, a portable metallic casing; an electric lamp mounted in the forward end of the casing and insulated therefrom; a switch tongue electrically connected to one terminal of the lamp; a switch having one member having a testing-cable-pin receiving bore and engaged with the casing wall and engageable with said tongue; a source of current having one terminal electrically connected with said casing and the other with other terminal of the lamp; an audible device mounted in the casing and having one terminal connected to the casing; and a conductive means adapted to receive a testing cable pin and insulated from, and carried by the casing, and electrically connected to the other terminal of the audible device.

12. In combination, a portable metallic casing; an exposed electric lamp mounted in the casing and insulated therefrom; an insulated switch tongue electrically connected to one terminal of the lamp; insulated means adapted to hold a metallic plug pin of a flexible testing cable engaged with said tongue; a switch having one member engaged with the casing wall and the other engageable with said tongue; a source of current having one terminal electrically connected with said casing and the other with the other terminal of the lamp; an audible device mounted in the casing and having one terminal connected to the casing; and a conductive means adapted to receive a testing cable pin and insulated from, and carried by the casing, and electrically connected to the other terminal of the audible device.

13. In combination, an elongated cylindrical metallic casing having an exteriorly threaded rear end; means to guide a metallic plug pin into said casing; a metallic disk mounted across the rear of the casing; a screw cap on said threaded end and covering the disk; a buzzer mounted in the cap on the disk and having one terminal connected to the disk; a conductive bushing insulated from and passing through said cap and electrically connected to the other terminal of the buzzer; a source of current in said casing, having one terminal electrically connected with said metallic disk; and means to connect the other terminal of the source with said pin.

14. In combination, a metallic casing; an insulated switch tongue therein; means to guide a metallic plug pin of a testing cable to engage said tongue; a metallic member longitudinally slidable in the casing wall and having a contact engageable with said tongue and having a bore to receive a cable plug pin; a metallic disk mounted across the rear of the casing; a cap on the casing covering the disk; a buzzer mounted in the cap on the disk and having one terminal connected to the disk; a conductive bushing insulated from and passing through said cap and electrically connected to the other terminal of the buzzer; and a source of current in said casing, having one terminal electrically connected with said tongue and the other with said metallic disk.

15. In combination, an elongated cylindrical metallic casing having a dielectric member in its forward end; a conductive lamp socket mounted on the member to hold an electric lamp thimble with its conductive tit disposed rearwardly; a switch tongue electrically connected to said socket; means to guide a metallic plug pin to engage said tongue; a metallic member longitudinally slidable in the casing wall and having a contact engageable with said tongue; a metallic disk mounted across the rear of the casing; a cap on the rear end of the casing covering the disk; a buzzer mounted in the cap on the disk and having one terminal connected to the disk; a conductive bushing insulated from and passing through said cap and electrically connected to the other terminal of the buzzer; and a source of current in said casing, having one terminal electrically connected with said tit and the other with said metallic disk.

CHARLES J. CARLOTTI.
FREDERICK A. CARLOTTI.